(12) United States Patent
Zhang et al.

(10) Patent No.: US 12,717,499 B2
(45) Date of Patent: Aug. 25, 2026

(54) MEDIA MANAGEMENT SYSTEM AND METHOD WITH MULTIPLE TIERS OF SYSTEM REQUIREMENTS

(71) Applicant: SK hynix Inc., Gyeonggi-do (KR)

(72) Inventors: Fan Zhang, San Jose, CA (US); Pengfei Huang, San Jose, CA (US)

(73) Assignee: SK hynix Inc., Gyeonggi-do (KR)

( * ) Notice: Subject to any disclaimer, the term of this patent is extended or adjusted under 35 U.S.C. 154(b) by 0 days.

(21) Appl. No.: 18/979,598

(22) Filed: Dec. 13, 2024

(65) Prior Publication Data

US 2026/0169635 A1 Jun. 18, 2026

(51) Int. Cl.
*G06F 3/06* (2006.01)

(52) U.S. Cl.
CPC ............ *G06F 3/0619* (2013.01); *G06F 3/064* (2013.01); *G06F 3/0653* (2013.01); *G06F 3/0679* (2013.01)

(58) Field of Classification Search
CPC ...... G06F 3/0619; G06F 3/064; G06F 3/0653; G06F 3/0679
USPC .................................................. 711/103, 102
See application file for complete search history.

(56) References Cited

U.S. PATENT DOCUMENTS

| | | | | |
|---|---|---|---|---|
| 12,001,349 | B2 | 6/2024 | Kim et al. | |
| 2016/0011815 | A1* | 1/2016 | Klein | G06F 3/0616 714/6.12 |
| 2023/0342046 | A1 | 10/2023 | Ryu et al. | |
| 2023/0367496 | A1* | 11/2023 | Cerafogli | G06F 3/0679 |

* cited by examiner

*Primary Examiner* — Hosain T Alam
*Assistant Examiner* — Zubair Ahmed
(74) *Attorney, Agent, or Firm* — IP & T GROUP LLP

(57) ABSTRACT

A system includes a host and a memory system, which includes a controller and a memory device including one or more superblocks for storing data. The host sets multiple system performance regions according to data type, on a plane which are formed by two or more system metrics. Each system performance region corresponds to at least one tier among multiple tiers of system requirements. The controller tracks the system metrics for each superblock associated with one or more read operations on the data; determines whether a condition of the system metrics is close to a boundary of a system performance region selected from among the multiple system performance regions, the selected system performance region corresponding to the data; and recycles the superblock when it is determined that the condition of the system metrics is getting close to the boundary of the selected system performance region.

18 Claims, 11 Drawing Sheets

Figure 2:
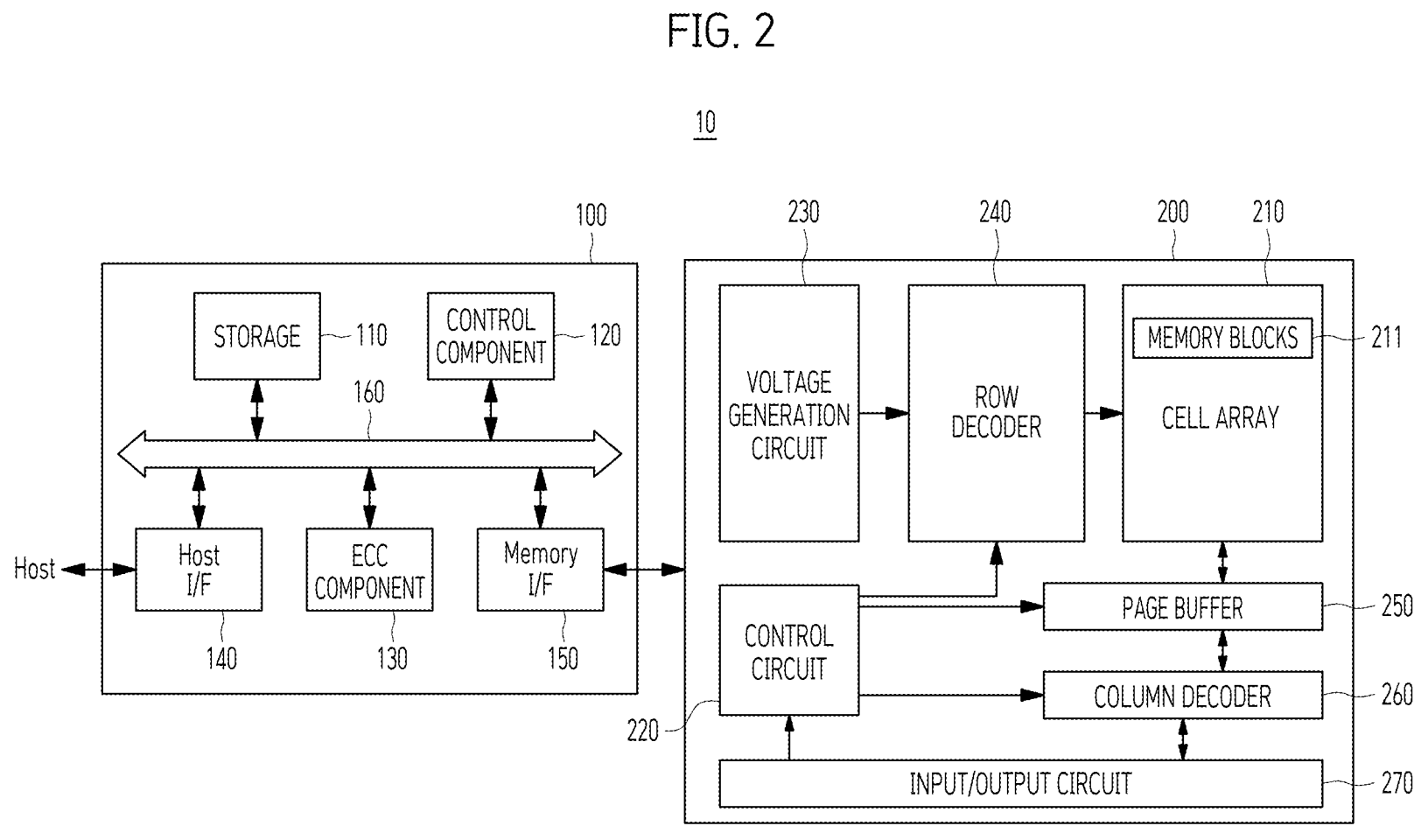

100
STORAGE 110
CONTROL COMPONENT 120
160
ECC COMPONENT 130
Host I/F 140
Memory I/F 150
Host 200
CELL ARRAY 210
MEMORY BLOCKS 211
VOLTAGE GENERATION CIRCUIT 230
ROW DECODER 240
CONTROL CIRCUIT 220
PAGE BUFFER 250
COLUMN DECODER 260
INPUT/OUTPUT CIRCUIT 270

MEDIA MANAGEMENT SYSTEM AND METHOD WITH MULTIPLE TIERS OF SYSTEM REQUIREMENTS

BACKGROUND

1. Field

Embodiments of the present disclosure relate to a scheme for media management of a memory system.

2. Description of the Related Art

The computer environment paradigm has shifted to ubiquitous computing systems that can be used anytime and anywhere. As a result, the use of portable electronic devices such as mobile phones, digital cameras, and notebook computers has rapidly increased. These portable electronic devices generally use a memory system having memory device(s), that is, data storage device(s). The data storage device is used as a main memory device or an auxiliary memory device of the portable electronic devices. Data storage devices using memory devices provide excellent stability, durability, high information access speed, and low power consumption, since they have no moving parts. Examples of data storage devices having such advantages include universal serial bus (USB) memory devices, memory cards having various interfaces, and solid state drives (SSD), which can be referred to as media.

Memory systems can be evaluated in terms of system requirements such as quality of service (QoS), performance and reliability. In this context, embodiments of the present invention for media management of system requirements arise.

SUMMARY

Aspects of the present invention include a media management method and a system to provide flexible multiple tiers of different levels of system requirements.

In one aspect, there is provided a method for performing media management operation. The method includes setting, by a host, multiple system performance regions according to data type, on a plane which are formed by two or more system metrics. Each system performance region corresponds to at least one tier among multiple tiers of system requirements. The method further includes tracking the system metrics for each superblock associated with one or more read operations on the data; determining whether a condition of the system metrics is close to a boundary of a system performance region selected from among the multiple system performance regions, the selected system performance region corresponding to the data; and recycling the superblock when it is determined that the condition of the system metrics is getting close to the boundary of the selected system performance region.

In another aspect, there is provided a system including a host and a memory system, which includes a controller and a memory device including one or more superblocks for storing data. The host may set multiple system performance regions according to data type, on a plane which are formed by two or more system metrics. Each system performance region may correspond to at least one tier among multiple tiers of system requirements. The controller may track the system metrics for each superblock associated with one or more read operations on the data; determine whether a condition of the system metrics is close to a boundary of a system performance region selected from among the multiple system performance regions, the selected system performance region corresponding to the data; and recycle the superblock when it is determined that the condition of the system metrics is getting close to the boundary of the selected system performance region.

Additional aspects of the present invention will become apparent from the following description.

BRIEF DESCRIPTION OF THE DRAWINGS

FIG. 2 is a block diagram illustrating a memory system.

FIGS. 9A and 9B are diagrams illustrating examples of 3-tier system requirements on a plane in accordance with embodiments of the present invention.

DETAILED DESCRIPTION

Figure 1:
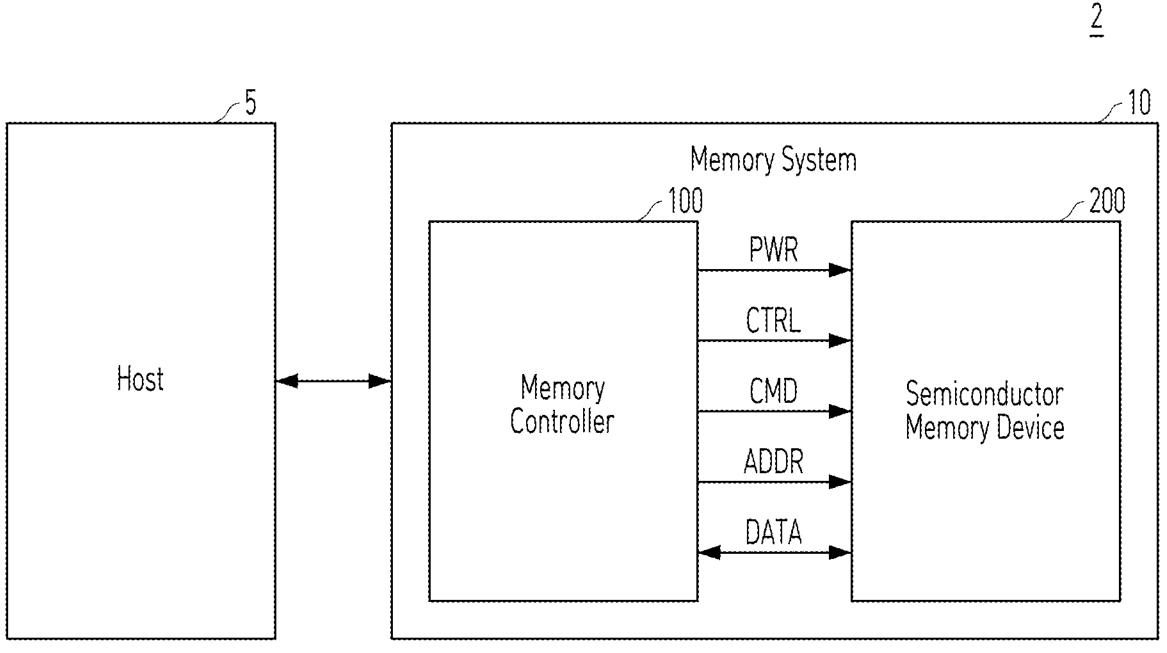
FIG. 1 is a block diagram illustrating a data processing system.

Various embodiments of the present invention are described below in more detail with reference to the accompanying drawings. The present invention may, however, be embodied in different forms and thus should not be construed as limited to the embodiments set forth herein. Rather, these embodiments are provided so that this disclosure conveys the scope of the present invention to those skilled in the art. Moreover, reference herein to "an embodiment," "another embodiment," or the like is not necessarily to only one embodiment, and different references to any such phrase are not necessarily to the same embodiment(s). The term "embodiments" as used herein does not necessarily refer to all embodiments. Throughout the disclosure, like reference numerals refer to like parts in the figures and embodiments of the present invention.

The present invention can be implemented in numerous ways, for example including as a process; an apparatus; a system; a computer program product embodied on a computer-readable storage medium; and/or a processor, such as a processor suitable for executing instructions stored on and/or provided by a memory coupled to the processor. In this specification, these implementations, or any other form that the present invention may take, may be referred to as techniques. In general, the order of the operations of disclosed processes may be altered within the scope of the present invention. Unless stated otherwise, a component such as a processor or a memory described as being suitable for performing a task may be implemented as a general device or circuit component that is configured or otherwise programmed to perform the task at a given time or as a specific device or as a circuit component that is manufactured or pre-configured or pre-programmed to perform the task. As used herein, the term 'processor' or the like refers to one or more devices, circuits, and/or processing cores suitable for processing data, such as computer program instructions.

The methods, processes, and/or operations described herein may be performed by code or instructions to be executed for example by a computer, processor, controller, or other signal processing device. The computer, processor, controller, or other signal processing device may be those described herein or one in addition to the elements described herein. Because the algorithms that form the basis of the methods (or operations of the computer, processor, controller, or other signal processing device) are described herein, the code or instructions for implementing the operations of the method embodiments may transform the computer, processor, controller, or other signal processing device into a special-purpose processor for performing any one of the methods herein.

If implemented at least partially in software, the controllers, processors, devices, modules, units, multiplexers, generators, logic, interfaces, decoders, drivers, generators and other signal generating and signal processing features may include, for example, a memory or other storage device for storing code or instructions to be executed, for example, by a computer, processor, microprocessor, controller, or other signal processing device.

A detailed description of various embodiments of the present invention is provided below along with accompanying figures that illustrate aspects of the present invention. The present invention is described in connection with such embodiments, but the present invention is not limited to any specific embodiment. The present invention encompasses numerous alternatives, modifications and equivalents. Numerous specific details are set forth in the following description in order to provide a thorough understanding of the present invention. These details are provided for the purpose of example; the present invention may be practiced without some or all of these specific details. For clarity, technical material that is known in technical fields related to the present invention has not been described in detail so that the invention is not unnecessarily obscured.

Semiconductor memory devices may be volatile or nonvolatile. The volatile semiconductor memory devices perform read and write operations at high speeds, while contents stored therein may be lost at power-off. The nonvolatile semiconductor memory devices may retain contents stored therein even at power-off. The nonvolatile semiconductor memory devices may be used to store contents, which must be retained regardless of whether they are powered.

With an increase in a need for a large-capacity memory device, a multi-level cell (MLC) or multi-bit memory device storing multi-bit data per cell is becoming more common. However, memory cells in an MLC non-volatile memory device must have threshold voltages corresponding to four or more discriminable data states in a limited voltage window. For improvement of data integrity in non-volatile memory devices, the levels and distributions of read voltages for discriminating the data states may be adjusted over the lifetime of the memory device to have optimal values during read operations and/or read attempts.

FIG. 1 is a block diagram illustrating a data processing system 2 in accordance with one embodiment of the present invention.

Referring FIG. 1, the data processing system 2 may include a host device 5 and a memory system 10. The memory system 10 may receive a request from the host device 5 and operate in response to the received request. For example, the memory system 10 may store data to be accessed by the host device 5.

The host device 5 may be implemented with any of various types of electronic devices. In various embodiments, the host device 5 may be an electronic device such as for example a desktop computer, a workstation, a three-dimensional (3D) television, a smart television, a digital audio recorder, a digital audio player, a digital picture recorder, a digital picture player, and/or a digital video recorder and a digital video player. In various embodiments, the host device 5 may be a portable electronic device such as for example a mobile phone, a smart phone, an e-book, an MP3 player, a portable multimedia player (PMP), and/or a portable game player.

The memory system 10 may be implemented with any of various types of storage devices such as a solid state drive (SSD) and a memory card. In various embodiments, the memory system 10 may be provided as one of various components in an electronic device such as for example a computer, an ultra-mobile personal computer (PC) (UMPC), a workstation, a net-book computer, a personal digital assistant (PDA), a portable computer, a web tablet PC, a wireless phone, a mobile phone, a smart phone, an e-book reader, a portable multimedia player (PMP), a portable game device, a navigation device, a black box, a digital camera, a digital multimedia broadcasting (DMB) player, a 3-dimensional television, a smart television, a digital audio recorder, a digital audio player, a digital picture recorder, a digital picture player, a digital video recorder, a digital video player, a storage device of a data center, a device capable of receiving and transmitting information in a wireless environment, a radio-frequency identification (RFID) device, as well as one of various electronic devices of a home network, one of various electronic devices of a computer network, one of electronic devices of a telematics network, or one of various components of a computing system.

The memory system 10 may include a memory controller 100 and a semiconductor memory device 200. The memory controller 100 may control overall operations of the semiconductor memory device 200 including those of bit error rate reporting as detailed below.

The semiconductor memory device 200 may perform one or more erase, program, and read operations under the control of the memory controller 100. The semiconductor memory device 200 may receive through input/output lines a command CMD, an address ADDR and data DATA. The semiconductor memory device 200 may receive power PWR through a power line and a control signal CTRL through a control line. The control signal CTRL may include for example a command latch enable signal, an address latch enable signal, a chip enable signal, a write enable signal, a read enable signal, as well as other operational signals depending on design and configuration of the memory system 10.

The memory controller 100 and the semiconductor memory device 200 may be integrated in a single semiconductor device such as a solid state drive (SSD). The SSD may include a storage device for storing data therein.

The memory controller 100 and the semiconductor memory device 200 may be integrated in a single semiconductor device such as a memory card. For example, the memory controller 100 and the semiconductor memory device 200 may be integrated to configure a personal computer (PC) card of personal computer memory card international association (PCMCIA), a compact flash (CF) card, a smart media (SM) card, a memory stick, a multimedia card (MMC), a reduced-size multimedia card (RS-MMC), a micro-size version of MMC (MMCmicro), a secure digital (SD) card, a mini secure digital (miniSD) card, a micro secure digital (microSD) card, a secure digital high capacity (SDHC), and/or a universal flash storage (UFS).

FIG. 2 is a block diagram illustrating a memory system in accordance with one embodiment of the present invention. For example, the memory system of FIG. 2 may depict the memory system 10 shown in FIG. 1.

Referring to FIG. 2, the memory system 10 may include a memory controller 100 and a semiconductor memory device 200. The memory system 10 may operate in response to a request from a host device (e.g., a request from host device 5 of FIG. 1), and in particular, store data to be accessed by the host device.

The memory device 200 may store data to be accessed by the host device.

The memory device 200 may be implemented with a volatile memory device such as for example a dynamic random access memory (DRAM) and/or a static random access memory (SRAM) or a non-volatile memory device such as for example a read only memory (ROM), a mask ROM (MROM), a programmable ROM (PROM), an erasable programmable ROM (EPROM), an electrically erasable programmable ROM (EEPROM), a ferroelectric random access memory (FRAM), a phase change RAM (PRAM), a magnetoresistive RAM (MRAM), and/or a resistive RAM (RRAM).

The controller 100 may control storage of data in the memory device 200. For example, the controller 100 may control the memory device 200 in response to a request from the host device. The controller 100 may provide data read from the memory device 200 to the host device, and may store data provided from the host device into the memory device 200.

The controller 100 may include a storage 110, a control component 120, which may be implemented as a processor such as for example a central processing unit (CPU), an error correction code (ECC) component 130, a host interface (I/F) 140 and a memory interface (I/F) 150, which are coupled through a bus 160.

The storage 110 may serve as a working memory of the memory system 10 and the controller 100, and storage 110 may store data for driving the memory system 10 and the controller 100 The storage 10 may store data for encoding and/or decoding the data bit information being transmitted/received. For example, when the controller 100 controls operations of the memory device 200, the storage 110 may store data used by the controller 100 and the memory device 200 for such operations as read, write, program and erase operations, including encoding and decoding.

The storage 110 may be implemented with a volatile memory such as a static random access memory (SRAM) or a dynamic random access memory (DRAM). As described above, the storage 110 may store data used by the host device in the memory device 200 for the read and write operations. To store the data, the storage 110 may include a program memory, a data memory, a write buffer, a read buffer, a map buffer, and the like.

The control component 120 may control general operations of the memory system 10, and a write operation or a read operation for the memory device 200, in response to a write request or a read request from the host device. The control component 120 may drive firmware or other program instructions, which can be referred to as a flash translation layer (FTL), to control operations of the memory system 10. For example, the FTL may perform operations such as logical-to-physical (L2P) mapping, wear leveling, garbage collection, and/or bad block handling. The L2P mapping is known as logical block addressing (LBA).

The ECC component 130 may detect and correct errors in the data read from the memory device 200 during the read operation as detailed below. In one embodiment, the ECC component 130 may not correct error bits when the number of the error bits is greater than or equal to a threshold number of correctable error bits, but instead may output an error correction fail signal indicating failure in correcting the error bits.

In various embodiments, the ECC component 130 may perform an error correction operation based on a coded modulation such as for example a low density parity check (LDPC) code, a Bose-Chaudhuri-Hocquenghem (BCH) code, a turbo code, a turbo product code (TPC), a Reed-Solomon (RS) code, a convolution code, a recursive systematic code (RSC), a trellis-coded modulation (TCM), or a Block coded modulation (BCM). As such, the ECC component 130 may include any and all circuits, systems or devices suitable for error correction operation. In one embodiment of the present invention, a quasi-cyclic LDPC matrix (detailed below) is used for data recovery and bit error reporting.

The host interface 140 may communicate with the host device through one or more of various communication standards or interfaces such as for example a universal serial bus (USB), a multimedia card (MMC), a peripheral component interconnect express (PCI-e or PCIe), a small computer system interface (SCSI), a serial-attached SCSI (SAS), a serial advanced technology attachment (SATA), a parallel advanced technology attachment (PATA), an enhanced small disk interface (ESDI), and an integrated drive electronics (IDE).

The memory interface 150 may provide an interface between the controller 100 and the memory device 200 to allow the controller 100 to control the memory device 200 in response to a request from the host device. The memory interface 150 may generate control signals for the memory device 200 and process data under the control of the control component 120. In one embodiment where the memory device 200 is a flash memory such as a NAND flash memory, the memory interface 150 may generate control signals for the memory and process data under the control of the control component 120.

The memory device 200 as shown for example in FIG. 2 may include a memory cell array 210, a control circuit 220, a voltage generation circuit 230, a row decoder 240, a page buffer 250, which may be in the form of an array of page buffers, a column decoder 260, and an input and output (input/output) circuit 270. The memory cell array 210 may include a plurality of memory blocks 211 which may store data. The voltage generation circuit 230, the row decoder 240, the page buffer array 250, the column decoder 260 and the input/output circuit 270 may form a peripheral circuit for the memory cell array 210. The peripheral circuit may perform program, read, or erase operations of the memory cell array 210. The control circuit 220 may control the peripheral circuit.

The voltage generation circuit 230 may generate operational voltages of various levels. For example, in an erase operation, the voltage generation circuit 230 may generate operational voltages of various levels such as for example an erase voltage and a pass voltage.

The row decoder 240 may be in electrical communication with the voltage generation circuit 230, and the plurality of memory blocks 211. The row decoder 240 may select at least one memory block among the plurality of memory blocks 211 in response to a row address generated by the control circuit 220, and transmit operation voltages supplied from the voltage generation circuit 230 to the selected memory blocks.

Figure 3:
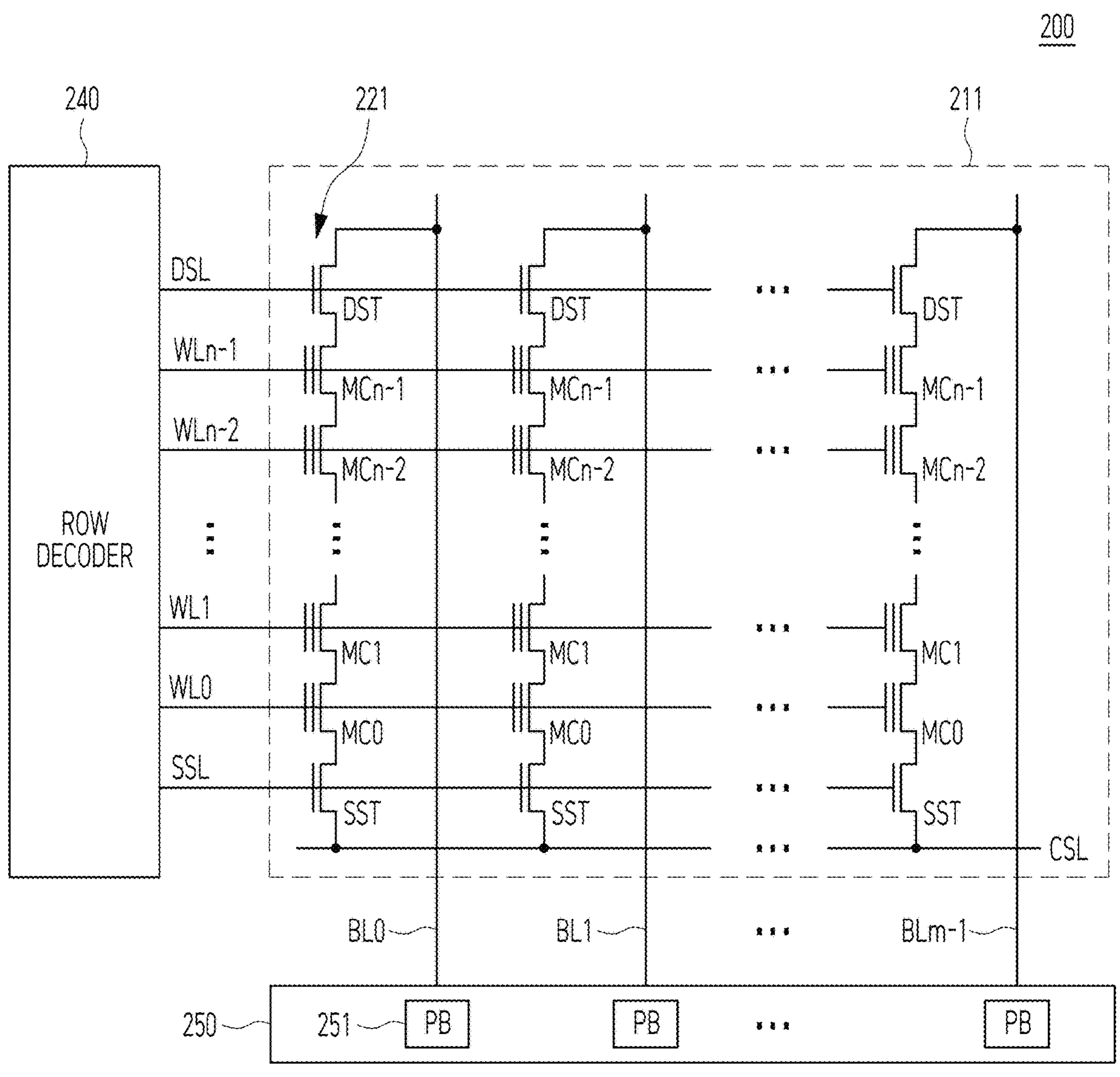
FIG. 3 is a circuit diagram illustrating a memory block of a memory device.

The page buffer 250 may be coupled with the memory cell array 210 through bit lines BL (shown in FIG. 3). The page buffer 250 may precharge the bit lines BL with a positive voltage, transmit data to, and receive data from, a selected memory block in program and read operations, or temporarily store transmitted data, in response to page buffer control signal(s) generated by the control circuit 220.

The column decoder 260 may transmit data to, and receive data from, the page buffer 250 or may transmit and receive data to and from the input/output circuit 270.

The input/output circuit 270 may transmit to the control circuit 220 a command and an address, received from an external device (e.g., the memory controller 100 of FIG. 1), transmit data from the external device to the column decoder 260, or output data from the column decoder 260 to the external device.

The control circuit 220 may control the peripheral circuit in response to the command and the address.

FIG. 3 is a circuit diagram illustrating a memory block of a semiconductor memory device in accordance with one embodiment of the present invention. For example, the memory block of FIG. 3 may be any of the memory blocks 211 of the memory cell array 210 shown in FIG. 2.

Referring to FIG. 3, the memory block 211 may include a plurality of word lines WL0 to WLn-1, a drain select line DSL and a source select line SSL coupled to the row decoder 240. These lines may be arranged in parallel, with the plurality of word lines between the DSL and SSL.

The memory block 211 may further include a plurality of cell strings 221 respectively coupled to bit lines BL0 to BLm-1. The cell string of each column may include one or more drain selection transistors DST and one or more source selection transistors SST. In the illustrated embodiment, each cell string has one DST and one SST. In a cell string, a plurality of memory cells or memory cell transistors MC0 to MCn-1 may be serially coupled between the selection transistors DST and SST. Each of the memory cells may be formed as a multiple level cell. For example, each of the memory cells may be formed as a single level cell (SLC) storing 1 bit of data. Each of the memory cells may be formed as a multi-level cell (MLC) storing 2 bits of data. Each of the memory cells may be formed as a triple-level cell (TLC) storing 3 bits of data. Each of the memory cells may be formed as a quadruple-level cell (QLC) storing 4 bits of data.

The source of the SST in each cell string may be coupled to a common source line CSL, and the drain of each DST may be coupled to the corresponding bit line. Gates of the SSTs in the cell strings may be coupled to the SSL, and gates of the DSTs in the cell strings may be coupled to the DSL. Gates of the memory cells across the cell strings may be coupled to respective word lines. That is, the gates of memory cells MC0 are coupled to corresponding word line WL0, the gates of memory cells MC1 are coupled to corresponding word line WL1, etc. The group of memory cells coupled to a particular word line may be referred to as a physical page. Therefore, the number of physical pages in the memory block 211 may correspond to the number of word lines.

The page buffer array 250 may include a plurality of page buffers 251 that are coupled to the bit lines BL0 to BLm-1. The page buffers 251 may operate in response to page buffer control signals. For example, the page buffers 251 may temporarily store data received through the bit lines BL0 to BLm-1 or sense voltages or currents of the bit lines during a read or verify operation.

In various embodiments of the present invention, the memory blocks 211 may include a NAND-type flash memory cell. However, the memory blocks 211 are not limited to such cell type, and may include NOR-type flash memory cell(s). Memory cell array 210 may be implemented as a hybrid flash memory in which two or more types of memory cells are combined, or one-NAND flash memory in which a controller is embedded inside a memory chip.

Figure 4:
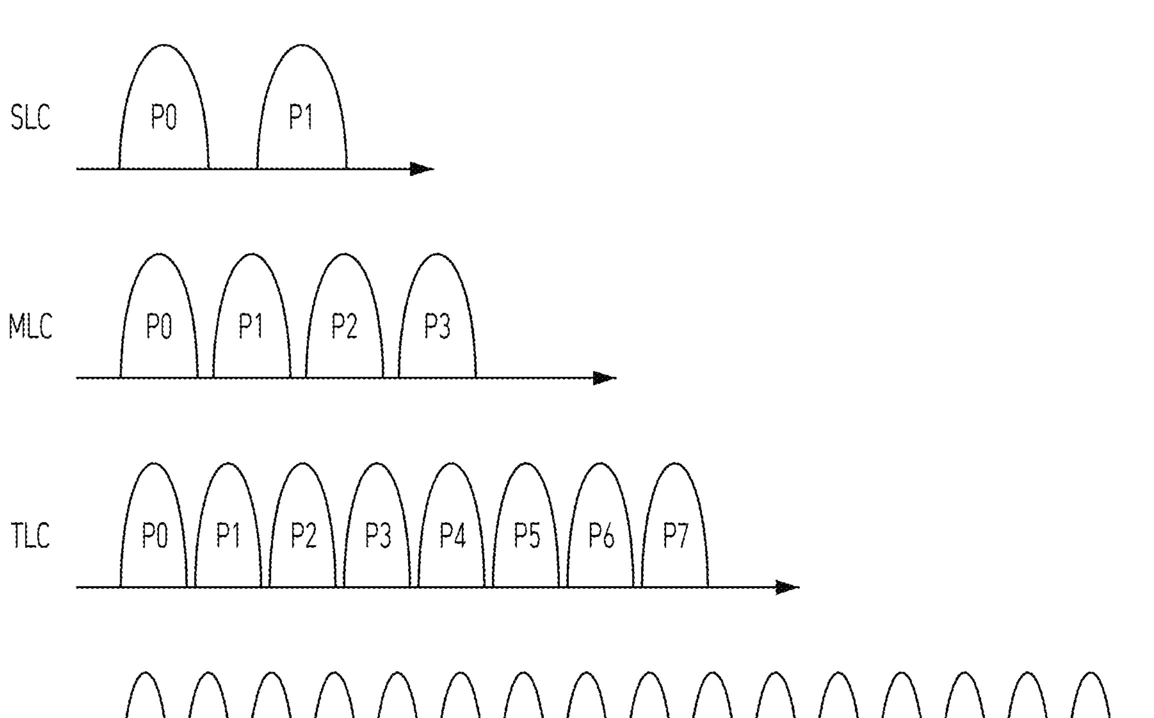
FIG. 4 is a diagram illustrating distributions of states for different types of cells of a memory device.

FIG. 4 is a diagram illustrating distributions of states or program voltage (PV) levels for different types of cells of a memory device.

Referring to FIG. 4, each of memory cells may be implemented with a specific type of cell, for example, a single level cell (SLC) storing 1 bit of data, a multi-level cell (MLC) storing 2 bits of data, a triple-level cell (TLC) storing 3 bits of data, or a quadruple-level cell (QLC) storing 4 bits of data. Usually, all memory cells in a particular memory device are of the same type, but that is not a requirement.

An SLC may include two states P0 and P1. P0 may indicate an erase state, and P1 may indicate a program state. Since the SLC can be set in one of two different states, each SLC may program or store 1 bit according to a set coding method. An MLC may include four states P0, P1, P2 and P3. Among these states, P0 may indicate an erase state, and P1 to P3 may indicate program states. Since the MLC can be set in one of four different states, each MLC may program or store two bits according to a set coding method. A TLC may include eight states P0 to P7. Among these states, P0 may indicate an erase state, and P1 to P7 may indicate program states. Since the TLC can be set in one of eight different states, each TLC may program or store three bits according to a set coding method. A QLC may include 16 states P0 to P15. Among these states, P0 may indicate an erase state, and P1 to P15 may indicate program states. Since the QLC can be set in one of sixteen different states, each QLC may program or store four bits according to a set coding method.

Referring back to FIGS. 2 and 3, the memory device 200 may include a plurality of memory cells (e.g., NAND flash memory cells). The memory cells are arranged in an array of rows and columns as shown in FIG. 3. The cells in each row are connected to a word line (e.g., WL0), while the cells in each column are coupled to a bit line (e.g., BL0). These word and bit lines are used for read and write operations. During a write operation, the data to be written ('1' or '0') is provided at the bit line while the word line is addressed. During a read operation, the word line is again addressed, and the threshold voltage of each cell can then be acquired from the bit line. Multiple pages may share the memory cells that belong to (i.e., are coupled to) the same word line. When the memory cells are implemented with MLCs, the multiple pages include a most significant bit (MSB) page and a least significant bit (LSB) page. When the memory cells are implemented with TLCs, the multiple pages include an MSB page, a center significant bit (CSB) page and an LSB page. When the memory cells are implemented with QLCs, the multiple pages include an MSB page, a center most significant bit (CMSB) page, a center least significant bit (CLSB) page and an LSB page. The memory cells may be programmed for example using a coding scheme (e.g., Gray coding) in order to increase the capacity of the memory system 10 such as SSD.

Figure 5A:
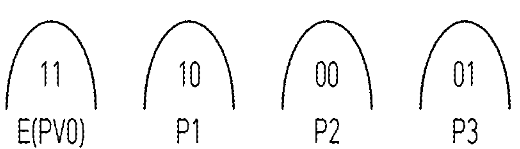
FIG. 5A is a diagram illustrating an example of Gray coding for a multi-level cell (MLC).

FIG. 5A is a diagram illustrating an example of coding for a multi-level cell (MLC).

Referring to FIG. 5A, an MLC may be programmed using a set type of coding. An MLC may have 4 program states, which include an erased state E (or PV0) and a first program state PV1 to a third program state PV3. The erased state E (or PV0) may correspond to "11." The first program state PV1 may correspond to "10." The second program state PV2 may correspond to "00." The third program state PV3 may correspond to "01."

Figure 5B:
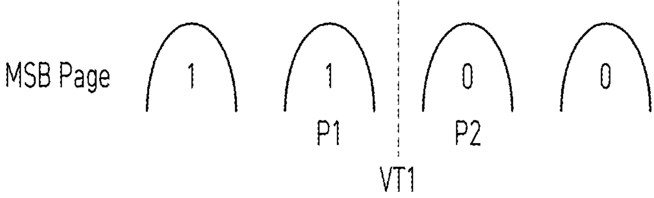
FIG. 5B is a diagram illustrating state distributions for pages of a multi-level cell (MLC).
Figure 5B:
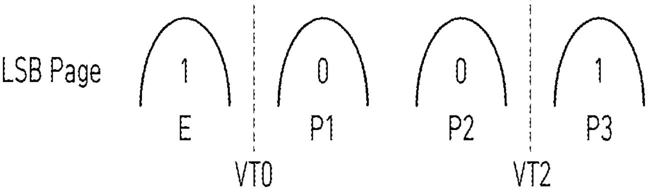

In the MLC, as shown in FIG. 5B, there are 2 types of pages including LSB and MSB pages. 1 or 2 thresholds may be applied in order to retrieve data from the MLC. For an MSB page, the single threshold value is VT1. VT1 distinguishes between the first program state PV1 and the second program state PV2. For an LSB page, 2 thresholds include a threshold value VT0 and a threshold value VT2. VT0 distinguishes between the erased state E and the first program state PV1. VT2 distinguishes between the second program state PV2 and the third program state PV3.

Figure 6A:
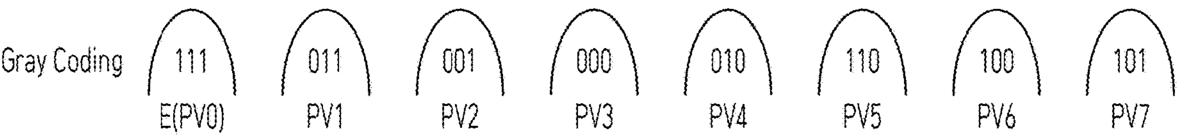
FIG. 6A is a diagram illustrating one example of Gray coding for a triple-level cell (TLC).

FIG. 6A is a diagram illustrating an example of Gray coding for a triple-level cell (TLC).

Referring to FIG. 6A, a TLC may be programmed using Gray coding. A TLC may have 8 program states, which include an erased state E (or PV0) and a first program state PV1 to a seventh program state PV7. The erased state E (or PV0) may correspond to "111." The first program state PV1 may correspond to "011." The second program state PV2 may correspond to "001." The third program state PV3 may correspond to "000." The fourth program state PV4 may correspond to "010." The fifth program state PV5 may correspond to "110." The sixth program state PV6 may correspond to "100." The seventh program state PV7 may correspond to "101."

Figure 6B:
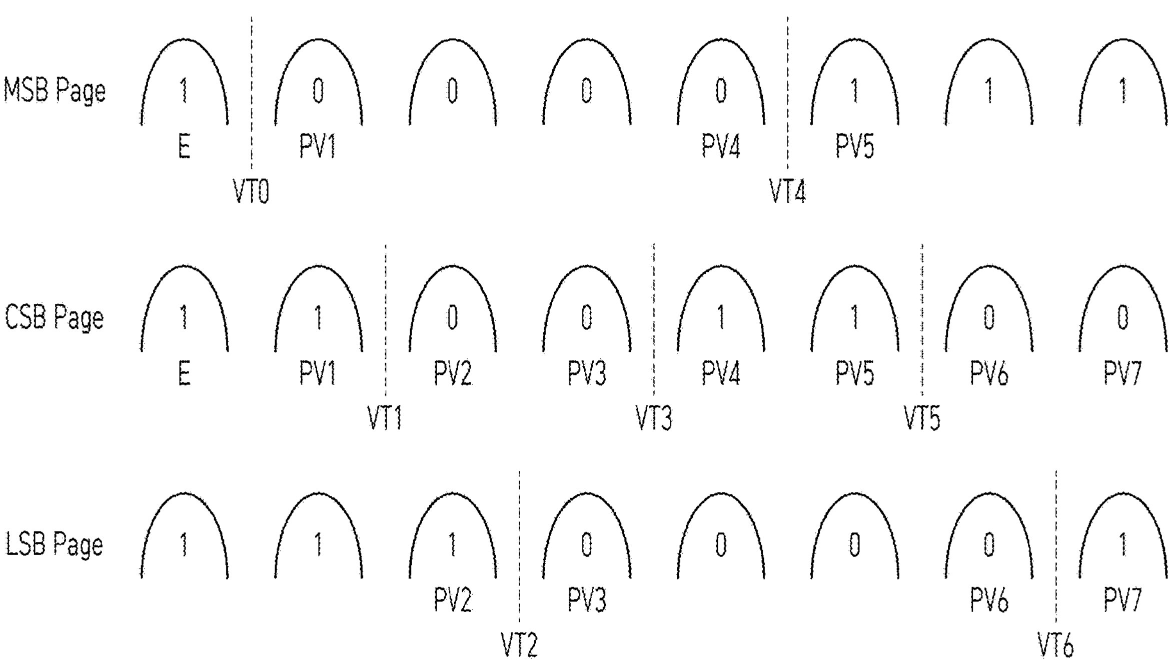
FIG. 6B is a diagram illustrating state distributions for pages of a triple-level cell (TLC).

In the TLC, as shown in FIG. 6B, there are 3 types of pages including LSB, CSB and MSB pages. 2 or 3 thresholds may be applied in order to retrieve data from the TLC. For an MSB page, 2 thresholds include a threshold value VT0 that distinguishes between an erase state E and a first program state PV1 and a threshold value VT4 that distinguishes between a fourth program state PV4 and a fifth program state PV5. For a CSB page, 3 thresholds include VT1, VT3 and VT5. VT1 distinguishes between a first program state PV1 and a second program state PV2. VT3 distinguishes between a third program state PV3 and the fourth program state PV4. VT5 distinguishes between the fourth program state PV5 and the sixth program state PV6. For an LSB page, 2 thresholds include VT2 and VT6. VT2 distinguishes between the second program state PV2 and the third program state PV3. VT6 distinguishes between the sixth program state PV6 and a seventh program state PV7.

After a memory array including a plurality of memory cells is programmed as described in FIGS. 5A and 6A, when a read operation is performed on the memory array using a reference voltage such as a read threshold voltage (also called "read voltage level" or "read threshold"), the electrical charge levels of the memory cells (e.g., threshold voltage levels of transistors of memory cells) are compared to one or more reference voltages to determine the state of individual memory cells. When a specific read threshold is applied to the memory array, those memory cells that have threshold voltage levels higher than the reference voltage are turned on and detected as "on" cell, whereas those memory cells that have threshold voltage levels lower than the reference voltage are turned off and detected as "off" cell, for example. Therefore, each read threshold is arranged between neighboring threshold voltage distribution windows corresponding to different programmed states so that each read threshold can distinguish such programmed states by turning on or off the memory cell transistors.

When a read operation is performed on memory cells in a data storage device using MLC technology, the threshold voltage levels of the memory cells are compared to more than one read threshold level to determine the state of individual memory cells. Read errors can be caused by distorted or overlapped threshold voltage distributions. An ideal memory cell threshold voltage distribution can be significantly distorted or overlapped due to, e.g., program and erase (P/E) cycles, cell-to-cell interference, and/or data retention errors. For example, as program/erase cycles increase, the margin between neighboring threshold voltage distributions of different programmed states decreases and eventually the distributions overlap. As a result, the memory cells with threshold voltages that fall within the overlapping region of the neighboring distributions may be read as being programmed to a value other than the original targeted value and thus cause read errors. Such read errors may be managed in many situations by using error correction codes (ECC). When the number of bit errors on a read operation exceeds the ECC correction capability of the data storage, the read operation using a set read threshold voltage fails. The set read threshold voltage may be a previously used read threshold voltage (i.e., a historical read threshold voltage). The historical read threshold voltage may be the read threshold voltage used in the last successful decoding, that is, a read voltage used in a read-passed read operation performed before read retry operations. When the read operation using the set read threshold voltage failed, the controller 120 may control an error recovery algorithm.

For a solid state drive, one source of increased bit errors is the use of sub-optimal read thresholds during the read operation. One method (e.g., an eBoost algorithm) to estimate an optimal read threshold performs several additional read operations with different read thresholds on the same page, and estimates the optimal read threshold that minimizes the bit errors in the retrieved data. These additional read operations may increase the latency of the read operation and may degrade a quality of service (QoS) of the data storage device (or memory system).

Figure 7:
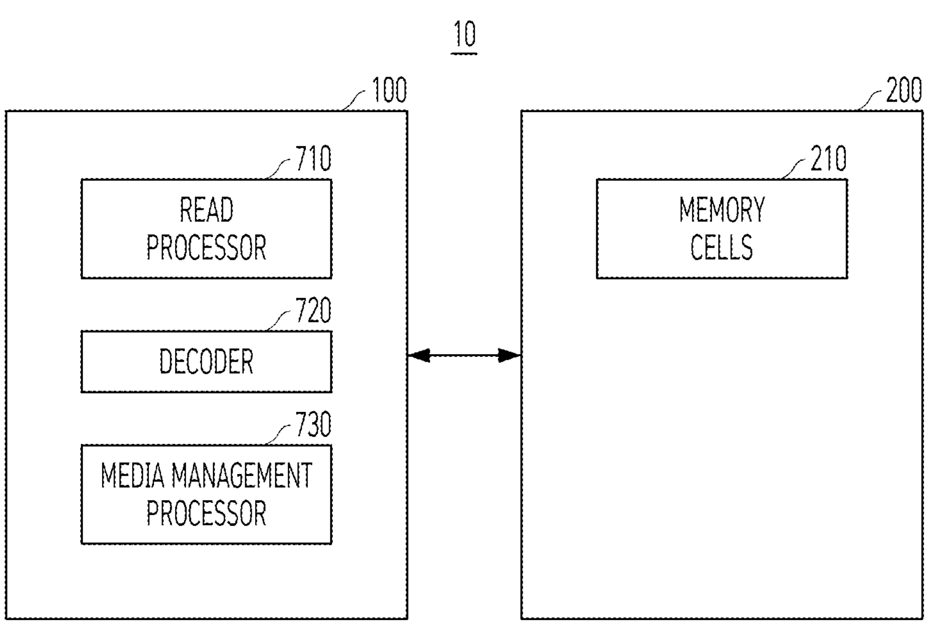
FIG. 7 is a diagram illustrating a memory system in accordance with one embodiment of the present invention.

FIG. 7 is a diagram illustrating a memory system 10 in accordance with one embodiment of the present invention.

Referring to FIG. 7, the memory system 10 may include a controller 100 and a memory device 200. The memory device 200 may include a plurality of memory cells (e.g., NAND flash memory cells) 210. The memory cells are arranged in an array of rows and columns such as shown in FIG. 3. The cells in each row are connected to a word line (e.g., WL0), while the cells in each column are coupled to a bit line (e.g., BL0). These word and bit lines are used for read and write operations. During a write operation, the data to be written ('1' or '0') is provided at the bit line while the word line is addressed. During a read operation, the word line is again addressed, and the threshold voltage of each cell can then be acquired from the bit line. Multiple pages may share the memory cells that belong to (i.e., are coupled to) the same word line. When the memory cells are implemented with MLCs, the multiple pages include a most significant bit (MSB) page and a least significant bit (LSB) page. When the memory cells are implemented with TLCs, the multiple pages include an MSB page, a center significant bit (CSB) page and an LSB page. When the memory cells are implemented with QLCs, the multiple pages include an MSB page, a center most significant bit (CMSB) page, a center least significant bit (CLSB) page and an LSB page. The memory cells may be programmed using a coding scheme (e.g., Gray coding) in order to increase the capacity of the memory system 10 such as an SSD.

The controller 100 may include a read processor 710, and a decoder 720. Although it is illustrated that components of the controller 100 are implemented separately, these components may be implemented with an internal component (i.e., firmware (FW)) of the control component 120 in FIG. 2. The controller 100 and the memory device 200 may include various other components such as those shown in FIG. 2. Further, the controller 100 may include a media management processor 730 which is described later.

The read processor 710 may control one or more read operations for the memory device 200 in response to a read request from a host (e.g., the host 5 of FIG. 1). The read processor 710 may control the read operations using various read thresholds. The decoder 720 may decode data associated with the read operations.

In various embodiments of the present invention, the read processor 710 may control a read operation for the memory cells using a select read threshold from a set read level table. In various embodiments, the read level table may include multiple read thresholds and the select read threshold may include a default read threshold. When the read operation is performed for the MSB page of TLC, the select read threshold may include a pair of first and second read thresholds [VT0, VT4] as shown in FIG. 6B. The first read threshold value VT0 is used to distinguish between an erase state (i.e., E) and a first program state (i.e., PV1), and the second read threshold value VT4 is used to distinguish between a fourth program state (i.e., PV4) and a fifth program state (i.e., PV5). When the read operation is performed for the LSB page of TLC, the select read threshold may include a pair of first and second read thresholds [VT2, VT6] such as shown in FIG. 6B. The first read threshold value VT2 is used to distinguish between a second program state (i.e., PV2) and a third program state (i.e., PV3), and the second read threshold value VT6 is used to distinguish between a sixth program state (i.e., PV6) and a seventh program state (i.e., PV7).

In one embodiment of the present invention, it is determined whether the read operation using a read threshold selected from a read threshold set succeeded or failed, depending on the decoding result of the decoder 720. When the read operation using the selected read threshold failed, the read processor 710 may control one or more read retry operations for the memory cells using read retry entries.

Figure 8:
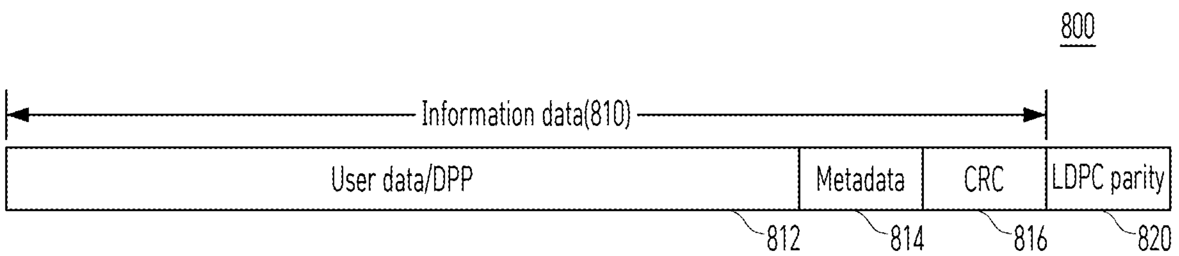
FIG. 8 is a diagram illustrating a format of a codeword to be stored in a storage system in accordance with embodiments of the present invention.

As background, FIG. 8 is a diagram illustrating a format of a codeword 800 to be stored in a storage system. Referring to FIG. 8, the codeword 800 may include information data 810 (information bits or user data) and LDPC parity data 820. In some embodiments, the codeword 800 may be generated by the LDPC codes noted above.

The information data 810 may include user data with data path protection (DPP) 812, meta-data 814 and cyclic redundancy check (CRC) parity bits 816. A CRC code which is an error-detecting code commonly used in digital networks and storage devices may detect accidental changes to raw data.

In a typical LDPC decoder, if the LDPC checksum is zero, the decoding may be terminated. The CRC parity bits 816 will be computed based on the decoded user data 812 and meta-data 814 after the LDPC decoding. If the computed CRC parity bits match the decoded CRC parity bits, decoding may be successful. Otherwise, a mis-correction may be declared.

As more background, when a QLC NAND is applied in enterprise memory systems (e.g., SSDs), it is often very challenging due to poor media quality or is very costly due to over design of the systems to ensure quality of service (QoS), performance and sometimes reliability throughout the entire lifetime and all NAND conditions. On the other hand, customers often do not require the highest QoS, performance and reliability in all the data. It is common that a host may have data or files (collective referred to as data) which have different requirements (for example different "read temperatures") on the QoS, performance and reliability on each category. For example, the data of the host may be classified into hot data, warm data and cold data. Hot data refers to frequently accessed (or read) data that needs immediate retrieval. Warm data refers to data that is accessed less frequently but still needs relatively quick access. Cold data refers to data that is rarely accessed and can be stored on slower, cheaper storage mediums like archives. That is, the hot data is the most actively used, while the cold data is the least accessed. For the hot data, the host typically requires low access latency and high performance and reliability. For the warm data, QoS and performance requirements can be lower. For cold data, not only QoS and performance requirements but also reliability requirements may be lower. The reason is that the host may rely on slower and cheaper devices such as tapes or hard disk drives (HDDs) to form a redundant array of independent disks (RAID) to recover the cold data on SSD when there is an uncorrectable error correction code (UECC) condition. In this way, even cold data can be accessed at low latency (compared to HDDs and tapes) which is often required in modern internet data center (IDC) traffic. With such usage case, it does not make sense to design a QLC SSD with only 1 tier of system requirements such as QoS, performance and reliability metrics. Accordingly, embodiments of the present invention provide a scheme of media management to provide flexible multiple tiers of different levels of system performance requirements such as QoS, performance and reliability. In some embodiments, each tier is specified by certain requirements on QoS, performance, and reliability. Different ties may be designed to meet the requirement from different host applications. In one embodiment, Tier-1 is more strict than Tier-2 which is more strict than Tier-3. In the illustrated example of FIGS. 9A and 9B, Tier-1 QoS may require 200 μs latency, Tier-2 QoS may require 400 μs latency, and Tier-3 QoS may require 600 μs latency. Providing for multiple tiers of system requirements can help lower the cost of SSD in both SSD development and manufacture (e.g., NAND yield) and also may provide some flexibility to the host.

Multiple Tiers of QoS/Performance/Reliability

Embodiments of the present invention provide multiple tiers of system requirements. The system requirements may include Qos, performance and reliability as evaluation factors of the memory system 10. The QoS requirement refers to the consistency and predictability of an SSD's performance, particularly its latency (response time) and IOPS (Input/Output Operations Per Second), even under varying workloads, ensuring a steady level of performance without sudden drops.

In one embodiment of the present disclosure, multiple system performance regions may be formed on a two-dimensional (2D) plane. The 2D plane may be formed by two or more system metrics. In the illustrated example of FIG. 9A, the 2D plane may be formed by two system metrics of read disturb and retention. Read disturb is a phenomenon in NAND flash memory where reading data from a flash cell can cause the threshold voltages of other (unread) cells. To measure the read disturb, read count can be used. Retention is the amount of time that can be reliably stored in a NAND flash memory cell without corruption. For example, the 2D plane is formed by read count (million) and retention time (i.e., day).

The 2D plane can be formed by three or more system metrics. In the illustrated example of FIG. 9B, the 2D plane may be further formed by system metrics such as endurance, temperature, wordline (WL) index, etc., which may affect fail bit count (FBC) characteristics. Different wordlines exhibit different behaviors and characteristics due to the NAND architecture and manufacture process. For example, usually the boundary wordlines have larger fail bit count. To measure the endurance, program and erase cycle count (PEC) can be used. PEC refers to the number of times the flash memory has been programmed and erased. As the endurance of the memory system wanes, so does the data retention time. Both high and low temperatures can negatively impact data retention.

Figure 9A:
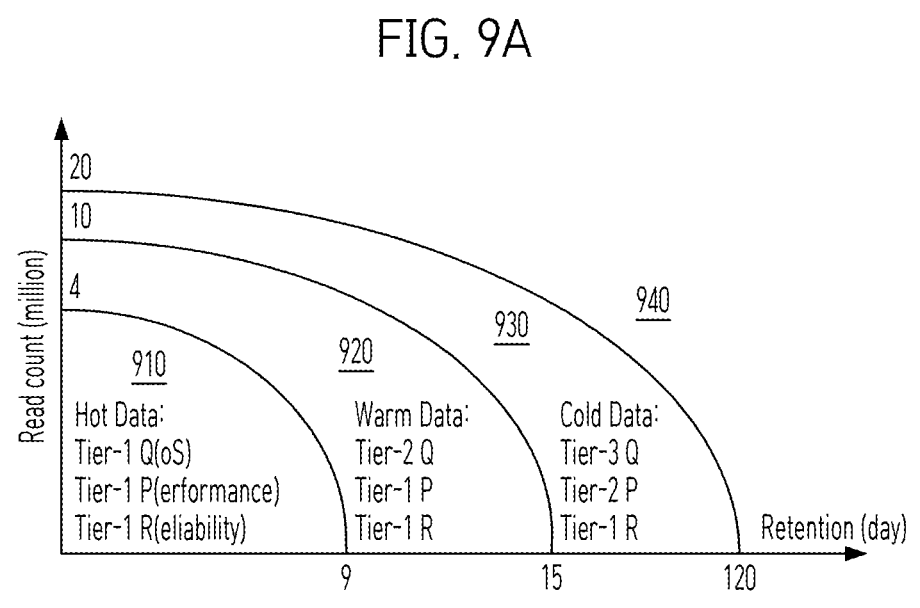

Referring to FIG. 9A, the multiple system performance regions and the multiple tiers of system requirements may be set by a host and/or firmware in a memory controller. For example, 3 tiers are set for QoS, 2 tiers are set for performance and 1 tier is set for reliability. Three system performance regions 910-940 may be set according to data type such as hot data, warm data and cold data. Each system performance region may correspond to at least one tier among multiple tiers of system requirements. For example, the system performance region 910 may correspond to the first tier for QoS, the first tier for performance and the first tier for reliability. The system performance region 920 may correspond to the second tier for QoS, the first tier for performance and the first tier for reliability. The system performance region 930 may correspond to the third tier for Qos, the second tier for performance and the first tier for reliability. In some embodiments, the number of tiers may be arbitrary.

In FIG. 9A, the 2D plane of read disturb and retention is divided into 4 system performance regions. The boundary of the regions are defined by certain QoS targets. That is, all the points on the line between 910 and 920 (i.e., the group 910) give the same QoS, and all the points on the line between 920 and 930 (i.e., the group 920) give the same QoS but worse than the line between 910 and 920. The boundaries can also be defined by performance or reliability or a combined metric of QoS, performance and reliability, depending on the objective of constructing the tiers.

In some embodiments, the QoS of the regions can be defined according to the requirement of the host (e.g., the host 5 of FIG. 1) regarding hot, warm and cold data's response time distribution. Once the QoS for 3 tiers are defined, the boundaries can be characterized during NAND characterization or drive level characterization. In this way, the host can have flexibility to define QoS for each of the tiers. For example, the host may define the region 910 to be a very small region close to the origin (0, 0) on the plane so that the QoS can be extremely good. The lower bound (best case) of QoS is the QoS of the origin. Multiple (more than 3) QoS boundaries may be characterized so that the host and firmware (FW) (e.g., the control component 120 of the controller 100 in FIG. 2, or the media management processor 730 of the controller 100 in FIG. 7) can set and change the QoS boundary differently for drives with different applications. For example, the host can set the regions 920 and 930 to be the same as the region 910 for a drive that is deployed to mission critical tasks and demand highest QoS for all the data on drive.

Media Management for a Multi-Tier System

In order to maintain QoS for a certain tier, firmware (e.g., the media management processor 730 of the controller 100 in FIG. 7 may keep track of the read count and retention for each super block. Once the working condition is getting close to the boundary, the firmware may recycle the super block so that the QoS is going back to the origin of the 2D plane. The recycling represents a garbage collection operation. According to the garbage collection, the valid pages in a original block is moved to another block and then the original block is erased.

One issue for the scheme is that an over-utilization of the hot QoS region 910 may trigger data recycle (i.e., garbage collection) more frequently. To make sure the recycle traffic is the same as 1-tier QoS scheme, embodiments of the invention introduce another constraint to media management policy to regulate the number of super blocks that can be placed within each QoS region of the 3-tier scheme.

Let's assume there are N super blocks in the system. The number of super blocks in tier-1 is x, the number of super blocks in tier-2 is y and the rest of the N-x-y super blocks are in tier-3. Further, the baseline may be a 1-tier scheme with 30 day retention and 6 million read disturb. For a static tiering system, the two inequalities in Equations (1) and (2) can be met so that the average recycle traffic from read disturb and retention is less than a threshold (i.e., the baseline):

$$\frac{x}{4} + \frac{y}{10} + \frac{N-x-y}{20} < \frac{N}{6} \tag{1}$$

$$\frac{x}{9} + \frac{y}{15} + \frac{N-x-y}{120} < \frac{N}{30} \tag{2}$$

When other dimensions are considered, i.e., totally k metrics are considered, embodiments of the invention can either make each tier to be a k-dimensional subspaces with (t−1) (k−1)-dimensional boundaries where t is the number of tiers. Another way to implement this is to define a 2D plane as FIG. 9A for each quantized condition in the rest (other than read and retention) of the metrics. For example, PEC can be quantized into 10 PEC bins, and for each PEC bin, a 2D 3-tier partition can be defined like FIG. 9A. This process can be repeated for each temperature bins if multiple temperate conditions are considered. To minimize performance loss from table look up operation which is used to check whether the current condition is close to the tier boundary or not, the majority of the tables can be stored in DRAM, and SRAM can be used to store the 2D 3-tier table for current PEC/temperature bin.

Computerized Method

Figure 10:
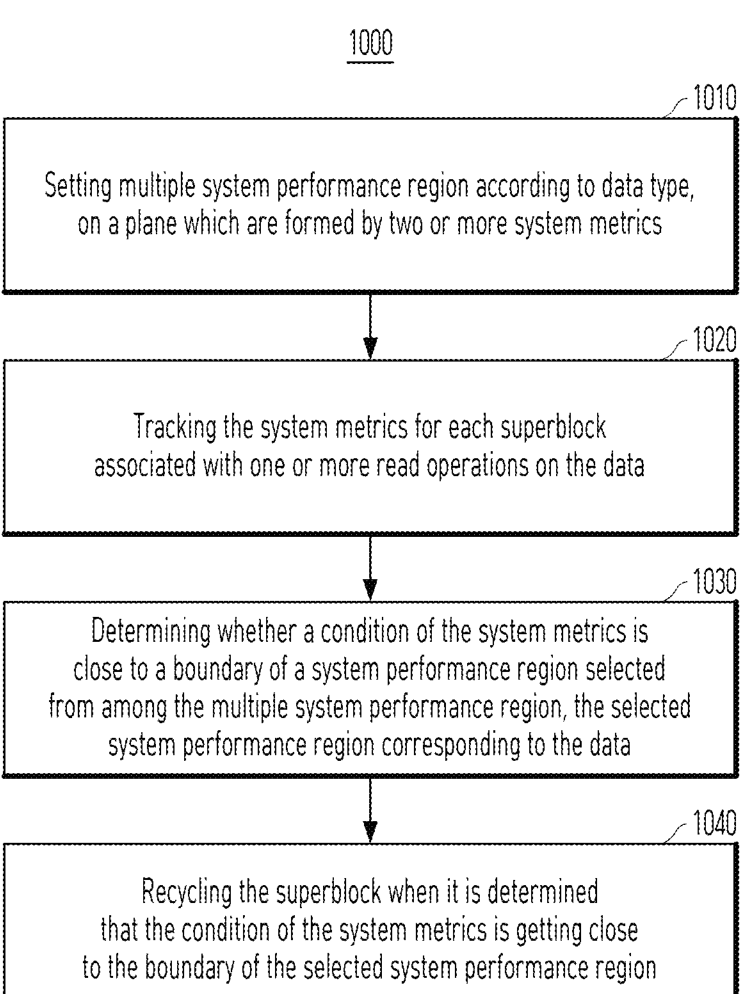
FIG. 10 is a flowchart illustrating a media management operation according to one embodiment of the invention.

In one embodiment of the present invention, there is provided a method 1000 in FIG. 10 for performing media management operation in according to one embodiment of the invention. The method 1000 may be performed by a system including a host (e.g., the host 5 of FIG. 1) and a memory system (e.g., the memory system 10 of FIG. 1), which includes a controller (e.g., the memory controller 100 of FIG. 1) and a memory device (e.g., the semiconductor memory device 200 of FIG. 1) including one or more superblocks for storing data. The method 1000 performed by controller 100 of the memory system 10. The method 100 performed by the controller may be implemented with firmware (FW), e.g., the firmware of the control component 120 of the controller 100 in FIG. 2, or the media management processor 730 of the controller 100 in FIG. 7.

Figure 9B:
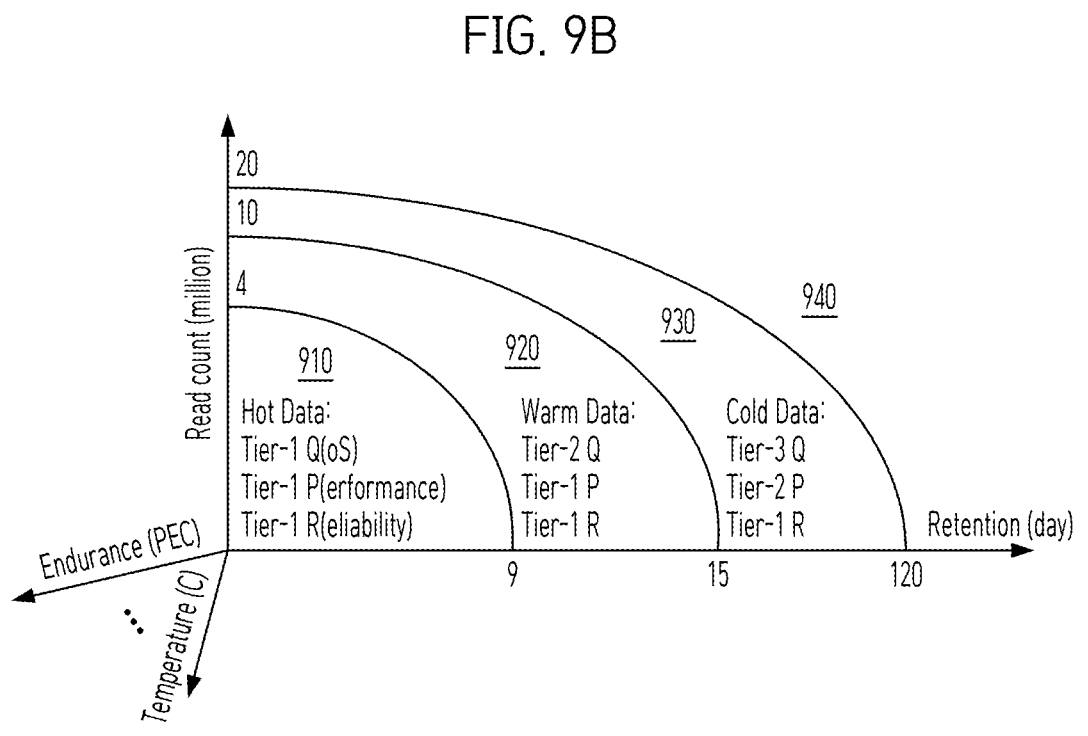

Referring to FIG. 10, the method 1000 includes, at 1010, setting, by the host, multiple system performance regions according to data type, on a plane which are formed by two or more system metrics. Each system performance region corresponds to at least one tier among multiple tiers of system requirements, as shown in FIGS. 9A and 9B.

The method 1000 includes operations 1020, 1030 and 1040, which are performed by the controller. The operation 1020 includes tracking the system metrics for each superblock associated with one or more read operations on the data. The operation 1030 includes determining whether a condition of the system metrics is close to a boundary of a system performance region selected from among the multiple system performance regions, the selected system performance region corresponding to the data. In one embodiment, the term "is close to" means that the condition of the system metrics is 95% of the boundary of the selected system performance region. The operation 1040 includes recycling the superblock when it is determined that the condition of the system metrics is getting close to (i.e., 95% of the boundary) the boundary of the selected system performance region.

In some embodiments, the method 1000 further includes transmitting, by the host, one or more read requests to the controller, and performing, by the controller, in response to the read requests, the one or more read operations on the data stored in the superblock.

In some embodiments, the system requirements include at least one of quality of service (QoS), performance and reliability.

In some embodiments, the system metrics include at least one of read count, retention, program and erase count, temperature and word line index.

In some embodiments, the data type includes at least one of hot data, warm data and cold data.

In some embodiments, the number of the tiers for the system metrics are different.

In some embodiments, for a system metric selected from among the system metrics, the multiple system performance regions correspond to the multiple tiers, respectively.

In some embodiments, for a system metric selected from among the system metrics, the multiple system performance regions correspond to one tier of the multiple tiers.

In some embodiments, the boundary of the selected system performance region is determined by at least one of the system metrics.

In some embodiments, the recycling of the superblock is performed such that the number of superblocks is regulated across the multiple system performance regions. In some embodiments, the number of superblocks in each performance region is determined or regulated such that the average recycle traffic of this multi-tier system can match the average recycle traffic of a 1-tier system which is considered as the baseline.

System

In another embodiment of the present invention, there is provided a system including a host and a memory system, which includes a controller and a memory device including one or more superblocks for storing data.

The host may set multiple system performance regions according to data type, on a plane which are formed by two or more system metrics. Each system performance region may correspond to at least one tier among multiple tiers of system requirements, as shown in FIGS. 9A and 9B.

The controller may track the system metrics for each superblock associated with one or more read operations on the data; determine whether a condition of the system metrics is close to a boundary of a system performance region selected from among the multiple system performance regions (e.g., 95% of the boundary), the selected system performance region corresponding to the data; and recycle the superblock when it is determined that the condition of the system metrics is getting close to the boundary of the selected system performance region (e.g., 95% of the boundary).

In some embodiments, the host may transmit one or more read requests to the controller, the controller may perform, in response to the read requests, the one or more read operations on the data stored in the superblock.

In some embodiments, the system requirements include at least one of quality of service (Qos), performance and reliability.

In some embodiments, the system metrics include at least one of read count, retention, program and erase count, temperature and word line index.

In some embodiments, the data type includes at least one of hot data, warm data and cold data.

In some embodiments, the number of the tiers for the system metrics are different.

In some embodiments, for a system metric selected from among the system metrics, the multiple system performance regions correspond to the multiple tiers, respectively.

In some embodiments, for a system metric selected from among the system metrics, the multiple system performance regions correspond to one tier of the multiple tiers.

In some embodiments, the boundary of the selected system performance region is determined by at least one of the system metrics.

In some embodiments, the recycling of the superblock is performed such that the number of superblocks is regulated across the multiple system performance regions.

Accordingly, embodiments of the present invention provide a scheme of media management to provide flexible multiple tiers of different levels of system requirements such as QoS, performance and reliability. Allowing multiple tiers of system requirements can help lower the cost of SSD in both SSD development and manufacture (e.g., NAND yield) and also provide some flexibility to the host.

Although the foregoing embodiments have been described in some detail for purposes of clarity of understanding, the invention is not limited to the details provided. There are many alternative ways of implementing the invention. The disclosed embodiments are illustrative and not restrictive. The present invention is intended to embrace all modifications and alternatives of the disclosed embodiment. Furthermore, the disclosed embodiments may be combined to form additional embodiments.

Indeed, implementations of the subject matter and the functional operations described in this patent document can be implemented in various systems, digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more modules of computer program instructions encoded on a tangible and non-transitory computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing unit" or "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices. The processor and the memory can be supplemented by, or incorporated in, special purpose logic circuitry.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations, one or more features from a combination can in some cases be excised from the combination, and the combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. A system comprising:

a memory system including a controller and a memory device, which includes one or more superblocks for storing data; and a host configured to set multiple system performance regions according to data type, on a plane which are formed by two or more system metrics, each system performance region corresponding to at least one tier among multiple tiers of system requirements, wherein the data type includes at least one of hot data, warm data, and cold data and the two or more system metrics include retention and at least one additional system metric, wherein the controller is configured to:

track the system metrics for each superblock associated with one or more read operations on the data;

determine whether a condition of the system metrics is close to a boundary of a system performance region selected from among the multiple system performance regions, the selected system performance region corresponding to the data; and recycle the superblock when it is determined that the condition of the system metrics is getting close to the boundary of the selected system performance region, wherein the controller is configured to implement a static tiering system, and to apply corresponding inequalities based on the multiple tiers with different retention and read disturb requirement to maintain average recycle traffic from read disturb and retention less than a threshold, and wherein the controller is configured to make each tier to be a k-dimensional subspaces with $(t-1)$ $(k-1)$-dimensional boundaries, where k is a number of the system metrics and t is a number of the multiple tiers.

2. The system of claim 1, wherein the host transmits one or more read requests to the controller, and the controller performs, in response to the read requests, the one or more read operations on the data stored in the superblock.

3. The system of claim 1, wherein the system requirements include at least one of quality of service (QoS), performance and reliability.

4. The system of claim 1, wherein the at least one additional system metric includes at least one of read count, program and erase count, temperature and word line index.

5. The system of claim 1, wherein the number of the tiers for the system metrics are different.

6. The system of claim 5, wherein, for a system metric selected from among the system metrics, the multiple system performance regions correspond to the multiple tiers, respectively.

7. The system of claim 5, wherein, for a system metric selected from among the system metrics, the multiple system performance regions correspond to one tier of the multiple tiers.

8. The system of claim 1, wherein the boundary of the selected system performance region is determined by at least one of the system metrics.

9. The system of claim 1, wherein the controller recycles the superblock such that the number of superblocks is regulated across the multiple system performance regions to make recycle traffic even across the multiple system performance regions.

10. A method for operating a system including a host and a memory system, which includes a controller and a memory device including one or more superblocks for storing data, the method comprising:

setting, by the host, multiple system performance regions according to data type, on a plane which are formed by two or more system metrics, each system performance region corresponding to at least one tier among multiple tiers of system requirements, wherein the data type includes at least one of hot data, warm data, and cold data and the two or more system metrics includes retention and at least one additional system metric;

tracking, by the controller, the system metrics for each superblock associated with one or more read operations on the data;

determining, by the controller, whether a condition of the system metrics is close to a boundary of a system performance region selected from among the multiple system performance regions, the selected system performance region corresponding to the data; and recycling, by the controller, the superblock when it is determined that the condition of the system metrics is getting close to the boundary of the selected system performance region, wherein the controller is configured to implement a static tiering system, and to apply corresponding inequalities based on the multiple tiers with different retention and read disturb requirement to maintain average recycle traffic from read disturb and retention less than a threshold, and wherein the controller is configured to make each tier to be a k-dimensional subspaces with (t−1) (k−1)-dimensional boundaries, where k is a number of the system metrics and t is a number of the multiple tiers.

11. The method of claim 10, further comprising:

transmitting, by the host, one or more read requests to the controller, and performing, by the controller, in response to the read requests, the one or more read operations on the data stored in the superblock.

12. The method of claim 10, wherein the system requirements include at least one of quality of service (QoS), performance and reliability.

13. The method of claim 10, wherein the at least one additional system metric includes at least one of read count, program and erase count, temperature and word line index.

14. The method of claim 10, wherein the number of the tiers for the system metrics are different.

15. The method of claim 14, wherein, for a system metric selected from among the system metrics, the multiple system performance regions correspond to the multiple tiers, respectively.

16. The method of claim 14, wherein, for a system metric selected from among the system metrics, the multiple system performance regions correspond to one tier of the multiple tiers.

17. The method of claim 10, wherein the boundary of the selected system performance region is determined by at least one of the system metrics.

18. The method of claim 10, wherein the recycling of the superblock is performed such that the number of superblocks is regulated across the multiple system performance regions.

* * * * *